United States Patent Office 3,070,634
Patented Dec. 25, 1962

3,070,634
STABILIZATION OF METHYLCHLOROFORM
Donald E. Hardies, and Blaine O. Pray, Wadsworth, Ohio, assignors, by mesne assignments, to Pittsburgh Plate Glass Company
No Drawing. Filed Mar. 1, 1960, Ser. No. 12,000
2 Claims. (Cl. 260—652.5)

This invention deals with methylchloroform. It especially concerns providing methylchloroform which is protected against decomposition, degradation and corrosive action on metals.

Methylchloroform, 1,1,1-trichloroethane, is a normally liquid chlorinated hydrocarbon useful in a variety of industrial solvent applications. It is useful for cleaning metal articles contaminated with greases, oils and the like by liquid phase degreasing. Unfortunately, its strong decomposition tendencies limit its value. In the degreasing of light metals such as aluminum, magnesium and their alloys with trace amounts of water present, the decomposition of methylchloroform is especially pronounced.

Methylchloroform is also a useful vapor pressure depressant in aerosols. It may be used as a vapor phase degreasing solvent. In these applications, methylchloroform's corrosiveness and/or instability is a serious deterrent. Realization of its full potential as a vapor depressant depends upon minimizing its corrosive action upon many of the metals used in aerosol containers. For it to be an effective vapor phase metal degreasing solvent, its instability under the conditions prevailing in degreasing should advisedly be minimized.

It has now been discovered that methylchloroform may be stabilized so as to reduce or eliminate its aforementioned limitations regarding instability and corrosiveness. Thus, methylchloroform of enhanced stability and other valued properties is hereby provided. These and other benefits are realized by incorporating in methylchloroform tetrahydrofuran, a lower aliphatic saturated alcohol, and an acetylenically unsaturated alcohol. Relatively small amounts of these materials are suitable.

In the preferred embodiment hereof, unusually effective stabilization of methylchloroform is provided by the simultaneous presence of tertiary-butyl alcohol, 2-methyl-3-butyn-2-ol and tetrahydrofuran in the methylchloroform. The effectiveness of a stabilizing system including these three components is apparently due to coaction therebetween as evidenced by experimental data.

The following example illustrates this invention and demonstrates the unique coaction of the additives in stabilizing methylchloroform:

EXAMPLE

A series of tests are conducted by a procedure in which an aluminum strip is immersed completely in a glass beaker filled with methylchloroform. With the strip covered by the methylchloroform, it is scratched. While at room temperature of 25° C., the contents of the flask are observed to determine evolution of gas, formation of dark precipitate, and discoloration of both the strip and methylchloroform. Evolution of gas and discoloration (both of the methylchloroform and strip) within short periods of time indicate instability.

The following table records results with methylchloroform and methylchloroform containing specified additives:

Table

| Composition | Additive Concentration, Percent by Weight | | | Test Results |
|---|---|---|---|---|
| | tetra-hydro-furan | t-butanol | 2-methyl-3-butyn-2-ol | |
| A | | | | Failure—Prompt evolution of gas; Solvent blackens into tarry mass in 30 minutes. |
| B | 0.5 | | | Failure—Prompt evolution of gas; Solvent blackens into tarry mass after short period of time. |
| C | 3.3 | | | Do. |
| D | | 1.5 | | Do. |
| E | | | 1.5 | Do. |
| F | 0.5 | 1.5 | | Failure—Prompt evolution of gas; Solvent blackens after several hours. |
| G | | 1.5 | 1.5 | Do. |
| H | 0.5 | | 1.5 | Failure—Prompt evolution of gas; Solvent blackens after about one hour. |
| I | 0.5 | 1.5 | 1.5 | After 24 hours, only slight corrosion; Solvent is free from tarry matter and but slightly yellow. |
| J | 1.0 | 1.5 | 1.5 | Do. |

In lieu of the specific alcohols above identified, other saturated aliphatic alcohols and other acetylenically unsaturated alcohols may be employed in conjunction with tetrahydrofuran to provide for the stabilization of methylchloroform.

Other alcohols besides the preferred, most effective 2-methyl-3-butyn-2-ol are the acetylenic alcohols (alcohols having a triple unsaturation —C≡C—) such as propargyl alcohol; 2-butyn-1-ol; 3-butyn-2-ol; 3-methyl-1-pentyn-3-ol; 3-methyl-1-pentyn-3-ol; 3-ethyl-1-pentyn-3-ol; 2-methyl-3-hexyn-2-ol; 3,5-dimethyl-1-hexyn-3-ol; 2,5-dimethyl-3-hexyn-2,5-diol; 3,6-dimethyl-4-octyn-3,6-diol and like alcohols which are sufficiently soluble in the methylchloroform. Mostly, these are 3 to 12 carbon acetylenic alcohols.

The saturated aliphatic alcohol component of this stabilizing system is ideally tertiary-butyl alcohol. Nevertheless, other lower molecular weight saturated alcohols, notably those of 1 to 8 carbons including methanol, ethanol, propanol, isopropanol, n-butanol, tertiary-amyl alcohol, hexanol and octanol are of value.

Usually, the concentration of tertiary-butanol or like saturated alcohol is between 0.5 and 3.0 percent, ideally about 1.5 percent, by weight of the methylchloroform. Higher or lower concentrations are not, however, precluded. Corresponding concentrations of the acetylenic alcohol (or mixture of acetylenic alcohols) are used.

Tetrahydrofuran is employed effectively in concentrations of at least about 0.5 percent by weight of the methylchloroform. Ideal concentrations are from 1.0 to 3.0 weight percent.

Other materials may also be included in the methylchloroform such as alkyl-amino phosphates or phosphites, e.g., the reaction product of (3-methylbutyl) (2-ethylhexyl) phosphoric acid and an amine such as dicyclohexylamine or a fatty amine such as decylamine, dodecylamine, hexadecylamine or octadecylamine.

While the invention has been described by reference to specific details of certain embodiments, it is not intended to limit the invention to such details except insofar as they appear in the claims.

We claim:
1. Stabilized methylchloroform containing 2-methyl-3-butyn-2-ol, tertiary-butanol and tetrahydrofuran.
2. Stabilized methylchloroform containing by weight 1.5 percent 2-methyl-3-butyn-2-ol, 1.5 percent tertiary-butanol and from 0.5 to 3.0 percent tetrahydrofuran.

References Cited in the file of this patent
UNITED STATES PATENTS

| | | |
|---|---|---|
| 2,371,644 | Petering et al. | Mar. 20, 1945 |
| 2,371,645 | Aitchison et al. | Mar. 20, 1945 |
| 2,603,622 | Berger et al. | July 15, 1952 |
| 2,841,625 | Burch et al. | July 1, 1958 |